(12) United States Patent
Weber et al.

(10) Patent No.: US 7,906,016 B2
(45) Date of Patent: Mar. 15, 2011

(54) CHEMICAL REACTORS

(75) Inventors: Robert S. Weber, Lincoln, MA (US);
Mark Marion, Boulder, CO (US);
Jayanti Sinha, Lexington, MA (US);
William Barney, Bedford, MA (US)

(73) Assignee: TIAX LLC, Lexington, MA (US)

( * ) Notice: Subject to any disclaimer, the term of this patent is extended or adjusted under 35 U.S.C. 154(b) by 381 days.

(21) Appl. No.: 12/194,918

(22) Filed: Aug. 20, 2008

(65) Prior Publication Data

US 2010/0044320 A1 Feb. 25, 2010

(51) Int. Cl.
*C09C 1/00* (2006.01)
*B01J 8/26* (2006.01)

(52) U.S. Cl. ......... 208/267; 210/749; 422/129; 422/255; 422/258; 422/259

(58) Field of Classification Search .................. 210/749; 422/129, 255, 258, 259; 208/267
See application file for complete search history.

(56) References Cited

U.S. PATENT DOCUMENTS

| 2,093,645 | A | * | 9/1937 | Podbielniak | 208/267 |
| 2004/0043262 | A1 | | 3/2004 | Asou et al. | |
| 2004/0252584 | A1 | * | 12/2004 | Ji et al. | 366/341 |
| 2006/0255672 | A1 | * | 11/2006 | Flores et al. | 310/90 |
| 2008/0219903 | A1 | | 9/2008 | de Broqueville | |

FOREIGN PATENT DOCUMENTS

| JP | 2005206404 A | 8/2005 |
| WO | 9819145 A1 | 5/1998 |
| WO | 2006104512 A1 | 10/2006 |
| WO | 2007031573 A1 | 3/2007 |

* cited by examiner

*Primary Examiner* — Walter D Griffin
*Assistant Examiner* — Huy-Tram Nguyen
(74) *Attorney, Agent, or Firm* — Karen B. King

(57) ABSTRACT

A system includes a first source including a first reactant; a second source including a second reactant capable of reacting with the first reactant to form a first product; and a reactor. The reactor includes a first element having a wall connecting a first point and a second point, the wall extending more than 180° around the first point; and a second element movably engaged with the first element to define a reconfigurable reaction chamber capable of being in fluid communication with the first and second reactants.

67 Claims, 11 Drawing Sheets

CHEMICAL REACTORS

FIELD OF THE INVENTION

The invention relates to chemical reactors and methods of performing reactions.

BACKGROUND

Chemical reactors are vessels in which chemical reactions take place. There are many types of chemical reactors including, for example, tank reactors and flow reactors that can be operated in continuous mode and/or batch mode.

There is interest in developing reactors that permit chemical processes to be intensified. By increasing the rates of mass transfer and energy transfer to, from and within a reactor, chemical reactions can be performed in smaller reactor volumes and/or with different reaction networks to improve productivity and reduce costs and waste production. Designs used in developing such chemical reactors include, for example, microchannels, static mixers, structured packings, jet impingement and rotating equipment.

SUMMARY

In one aspect, the invention features a system including a first source including a first reactant; a second source including a second reactant capable of reacting with the first reactant to form a first product; and a reactor including a first element having a wall connecting a first point and a second point, the wall extending more than 180° around the first point; and a second element movably engaged with the first element to define a reconfigurable reaction chamber capable of being in fluid communication with the first and second reactants.

Embodiments may include one or more of the following features. The wall crosses an imaginary line through the first and second points at least once on each side of the first point. The wall is asymmetric around the first point. The first element includes a first spiral element, and the second element includes a second spiral element movably engaged with the first spiral element. The reactor includes a plurality of chambers, each one of the plurality of chambers associated with a respective one of a plurality of regions of flow. The reactor further includes a driver configured to move the second element relative to the first element and to change a configuration of the reconfigurable reaction chamber. The driver is configured to move the second element in an orbiting fashion around the first point. The driver is configured to shift a line contact between the first and second elements and to generate flow turbulence in the reaction chamber. The driver is configured to generate a near-wall shear force having a magnitude higher than a predetermined shear force threshold. The predetermined shear force threshold is a function of the configuration of the reaction chamber and a characteristic of a chemical reaction in the reaction chamber. The driver is configured to modify a geometry of the reaction chamber. The driver is configured to modify at least one of following: a size, a shape, and a relative position of complementary components of the reaction chamber. The reactor further includes a controller configured to detect and control a condition of a chemical reaction in the reaction chamber. The condition of the chemical reaction is selected from the group consisting of: a temperature, a pressure, a flow rate, a mixing rate of the first and second reactants, a rate of thermal energy transfer, and a rate of mass transfer. The reactor is in thermal contact with a heater or cooler, and the controller is capable of controlling a rate of thermal energy transfer between the heater or cooler and the reactor. The system further includes a chamber housing capable of being in fluid communication with the reaction chamber. The chamber housing is coupled to a pressure regulator configured to regulate a pressure gradient between an inert fluid in the chamber housing and a mixture of the first and second reactants in the reaction chamber. The chamber housing is configured to relieve pressure in the reaction chamber at a predetermined pressure threshold. Each of the first and second reactants is in liquid form, the first and second reactants which may have a different fluid property. The first and second reactants have different viscosities. The reactor further includes a catalyst. The catalyst is associated with the wall of the first element in the reaction chamber. The system further includes a source capable of delivering photons into the reaction chamber.

In another aspect, the invention features a method of conducting a chemical reaction including changing a configuration of a reaction chamber containing the reaction, the reaction chamber being defined by a first element and a second element movably engaging the first element, wherein the first element has a wall connecting a first and second point, the wall extending at least 180° around the first point.

Embodiments may include one or more of the following features. The reaction includes a first reactant capable of forming a first product. The reaction includes a first reactant and a second reactant, the first and second reactants being liquids having a different fluid property. The first and second reactants have different viscosities. The wall the first element includes a first spiral element, and the second element includes a second spiral element movably engaged with the first spiral element. Changing the configuration of the reaction chamber includes changing a temperature, a pressure, and/or a geometry of the reaction chamber. Changing the geometry of the reaction chamber includes modifying one of following: a size, a shape, and a relative position of complementary components of the reaction chamber. Changing the configuration of the reaction chamber includes moving the second element relative to the first element. Changing the configuration of the reaction chamber includes orbiting the second element around the first point. Changing the configuration of the reaction chamber includes shifting a line contact between the first and second elements and generating a flow turbulence in the reaction chamber. Changing the configuration of the reaction chamber includes generating a near-wall shear force having a magnitude higher than a predetermined shear force threshold. The method further includes controlling a condition of the chemical reaction in the reaction chamber. The condition of the chemical reaction includes at least one of following: a temperature, a pressure, a flow rate, a mixing rate of the first and second reactants, a rate of thermal energy transfer, and a rate of mass transfer. The method further includes placing the reaction chamber in fluid communication with a chamber housing. The method further includes controlling a pressure gradient between an inert fluid in the chamber housing and the material in the reaction chamber. The method further includes relieving pressure in the reaction chamber at a predetermined pressure threshold through the chamber housing. The method further includes changing a reaction rate of the chemical reaction with a catalyst in the reaction chamber. The method further includes changing a reaction rate of the chemical reaction with photons in the reaction chamber.

In another aspect, the invention features a reactor for conducting a catalytic chemical reaction, the reactor including a first element having a wall connecting a first and a second point, the wall extending more than 180° around the first point; a second element movably engaged with the first element to define a reconfigurable reaction chamber capable of being in fluid communication with the first and second reactants; and a catalyst capable of changing a reaction rate of the chemical reaction.

Embodiments may include one or more of the following features. The wall crosses an imaginary line through the first and second point at least once on each side of the first point. The wall is asymmetric around the first point. The first element includes a first spiral element, and the second element includes a second spiral element movably engaged with the first spiral element. The reactor includes a plurality of chambers, each one of the plurality of chambers associated with a respective one of a plurality of regions of flow. The reactor further comprises a driver configured to move the second element relative to the first element and to change a configuration of the reconfigurable reaction chamber. The driver is further configured to shift a line contact between the first and second elements and generate a flow turbulence in the reaction chamber. The driver is further configured to generate a near-wall shear force having a magnitude higher than a predetermined shear force threshold. The reactor further includes a controller configured to control a condition of the chemical reaction in the reaction chamber. The condition of the chemical reaction includes at least one of following: a temperature, a pressure, a flow rate, a mixing rate of the first and second reactants, a rate of thermal energy transfer, and a rate of mass transfer. The catalyst includes a catalyst film on a wall of the reactor. The reactor is further configured to receive a first reactant associated with the chemical reaction.

In another aspect, the invention features a reactor for conducting a photochemical reaction involving a first material, the reactor including a first element having a wall connecting a first and a second point, the wall extending at least 180° around the first point; a second element movably engaged with the first element to define a reconfigurable reaction chamber capable of being in fluid communication with the first and second reactants; and a light path configured to allow passage of photons into the reaction chamber and to change a reaction rate of the photochemical reaction.

Embodiments may include one or more of the following features. The wall crosses an imaginary line through the first and second point at least once on each side of the first point. The wall is asymmetric around the first point. The first element includes a first spiral element, and the second element includes a second spiral element movably engaged with the first spiral element. The reactor includes a plurality of chambers, each one of the plurality of chambers associated with a respective one of a plurality of regions of flow. The light path includes an optical fiber associate with the wall of the first element and configured to deliver the photons to illuminate the reaction chamber. An index of refraction of the optical fiber satisfies a predetermine criterion in relation to an index of the reaction medium. The light path includes a quartz window. The reactor is coupled to a controller for controlling the passage of photons into the reaction chamber. The controller is configured to control at least one of following: a timing, a duration, and an amplitude of one or multiple doses of illumination. The reactor is coupled to a light source capable of generating photons associated with a plurality of ranges of wavelengths. The controller is configured to selectively allow a group of photons into the reaction chamber, the group of photons corresponding to a desired range of wavelengths determined based on a nature of the chemical reaction. The wall of the first element is coated with a photocatalyst capable of changing the reaction rate of the chemical reaction. The reactor is further configured to receive a first reactant associated with the chemical reaction.

The chemical reactors, systems and methods described herein can provide one or more of the following advantages or features.

The chemical reactors can provide excellent mixing (e.g., between fluids, including fluids having viscosities that differ by more than a factor of ten). By providing excellent mixing, a composition in a reaction chamber can be homogeneous, and more particularly, components of a reaction can exhibit substantially uniform distribution across a given cross section of a flow path.

The chemical reactors can provide good contact between components of a reaction and walls of the reaction chamber. The reaction components may communicate with additional sources and/or sinks of material through ports or permeable or semi-permeable walls supported on stationary and/or rotating elements or end plates of the reactor. Semi-permeable walls can be constructed from microporous materials or solid electrolytes that communicate with inlet and outlet ports and are mounted in the walls or other surfaces of the stationary and/or rotating elements.

The chemical reactors can generate large shear forces and micro-eddies near walls of the stationary and rotating elements. These near-wall large shear forces and turbulences can help improve the efficiency of mixing different reaction components, and help increase the rates of heat and mass transfer.

The chemical reactors can have highly efficient mass transfer. In some embodiments, the mass transfer coefficients measured with an immiscible liquids system (e.g., kerosene-acetic acid-water) can be greater than approximately $0.5\ s^{-1}$.

The chemical reactors can have highly efficient heat transfer. In some embodiments, the heat transfer coefficients measured with water can be greater than approximately $1000\ W\ m^{-2}K^{-1}$.

The chemical reactors can be designed to provide a reaction chamber with a high surface-to-volume ratio (e.g., greater than approximately $10\ cm^{-1}$), which can also help to increase the rates of heat and mass transfer.

The chemical reactors can allow real-time, fine control of reaction conditions, including but not limited to stoichiometry, pressure, temperature, catalyst contact time, and energy transfer rates, including thermal, electrical, and radioactive energy.

The chemical reactors can allow facile installation and interchange of catalysts and catalyst supports.

In some embodiments, the reaction chamber is configured to be able to vent directly into a chamber housing. The chamber housing together with the relative volumes of the reaction chamber provide contained pressure relief and rapid cooling, e.g., for a runaway or uncontrolled reaction.

The reactors may be operated in continuous, batch, and periodic batch modes including, for example, as a periodic batch reactor or a periodic swing bed absorber or adsorber.

The chemical reactors can be readily scaled, both up and down, without deteriorating the conditions that allow for process intensification, by changing the reactor dimensions, changing the cycle rate/throughput, and/or operating multiple reactors in parallel, for example.

The chemical reactors may be operated in a "daisy chain" fashion, e.g., by including multiple reactors, to perform sequential steps of a multi-step process.

The reactors can be operated as a compressor (e.g., to increase reaction rates), or as an expander (e.g., to recover work from reactions that evolve heat or gaseous products).

The chemical reactors may include coupled in-line analytical instruments to allow real-time feedback-controlled operation (e.g., optimization) of reaction conditions. Examples of coupled in-line instruments include instruments that measure a pressure, temperature, and/or flow rate of the reaction, and instruments that measure other physical characteristics (such as UV and visible light spectrometers, mass spectrometers, chromatographers).

The reactors can be equipped to provide addition or removal of species and/or energy, either continuously or discretely along a flow path from a reactor inlet to a reactor outlet. For example, fluid components can be introduced along the flow path through additional inlets with remotely controlled valves. The amount and/or rate of fluid components can be determined by process conditions using a feedback loop.

The reactors can be constructed from materials that are compatible with the reactants, products and reaction conditions.

The reactors can be configured to be compatible with a wide range of pressures (e.g., from vacuum to approximately 1500 psi), and in particular, be compatible with reactions that result in high pressures. Examples of high-pressure reactions include hydrogenations and the Fischer-Tropsch reaction.

The reactors and their components can be constructed by a variety of methods, including but not limited to machining, injection molding and three-dimensional printing, individually or in combination.

As used herein, the terms "chemical reactor" or "reactor" refers to a device that is capable of effecting a chemical change and/or a physical change (e.g., a change in state and/or a change in concentration) on a material that is introduced into and/or through the device. For example, reactant A and reactant B can be introduced into the reactor to form product C, with or without any remaining reactant A and/or reactant B. As another example, reactant X can be introduced to form product Y.

As used herein to describe spiral walls, "asymmetric" means that the spiral walls are not mirror images of each other. For example, asymmetric spiral walls can have different spiral lengths. The difference can be manifested at an internal or central end or at an external or outer end.

The details of one or more embodiments are set forth in the accompanying description below. Other aspects, features, and advantages of the invention will be apparent from the following drawings, detailed description of embodiments, and also from the appending claims.

DETAILED DESCRIPTION

1. System

Figure 1:
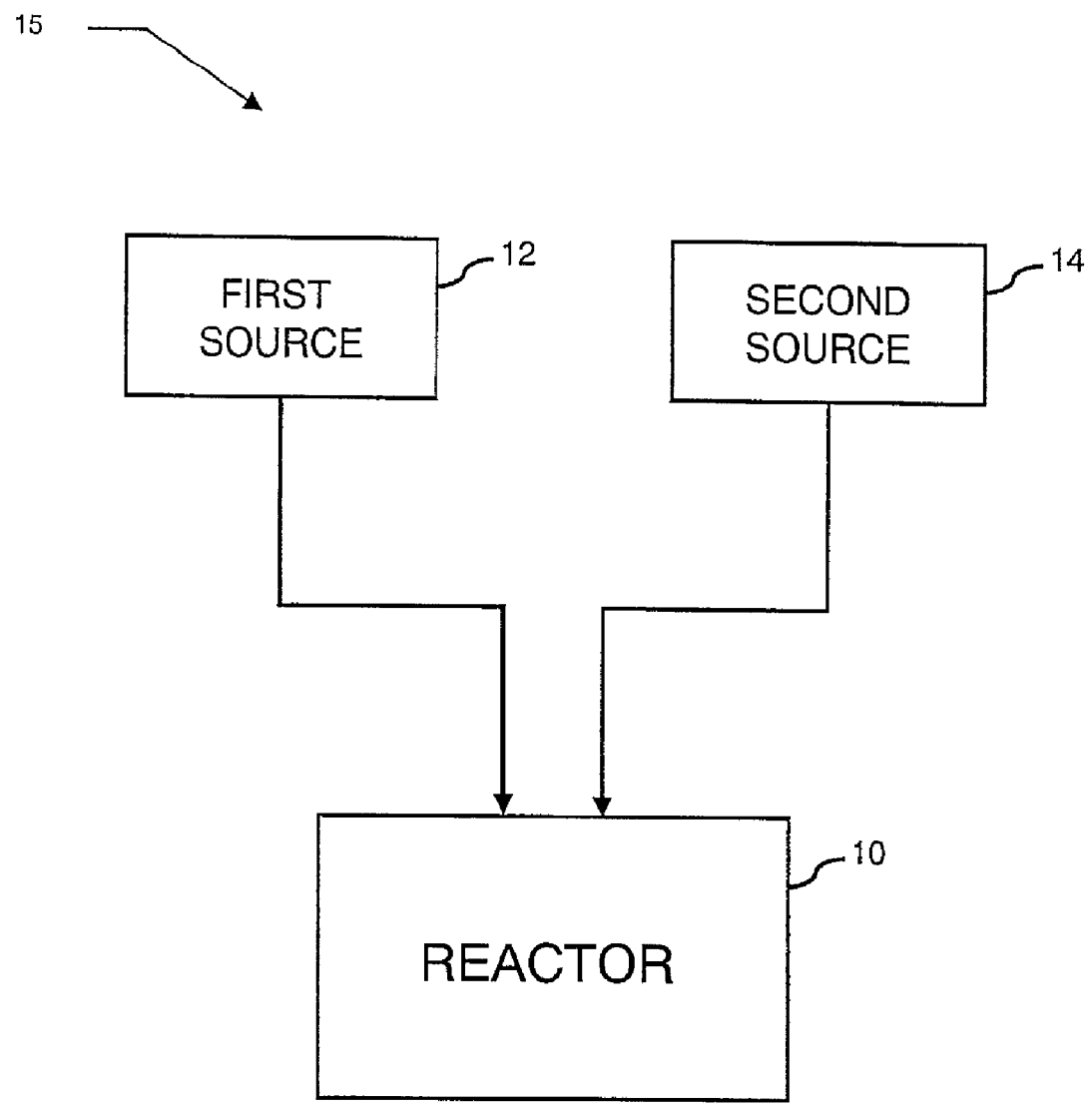
FIG. 1 is a schematic view of an embodiment of a system including a reactor.
Figure 2:
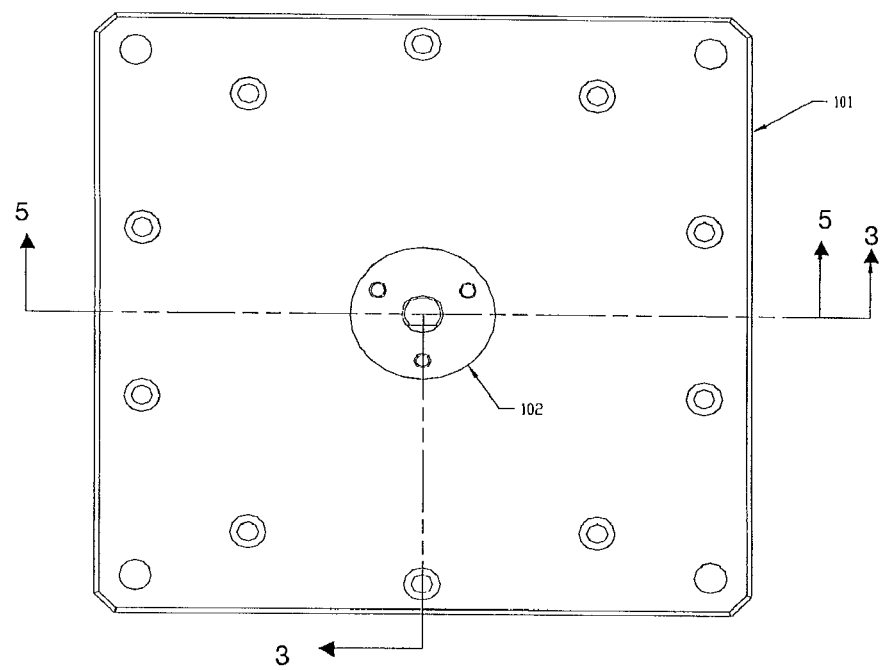
FIG. 2 is a top view of an embodiment of the reactor shown in FIG. 1.

Referring to FIG. 1, a system 15 for performing chemical reactions includes a chemical reactor 10 that is capable of being placed in selective fluid communication with a first source 12 and a second source 14. Sources 12, 14 contain, respectively, a first reactant and a second reactant that is different from the first reactant. Each one of first source 12 and second source 14 may contain one or multiple reactants provided in solid, liquid and/or gaseous form. Chemical reactor 10 provides a controlled environment in which the first reactant and the second reactant can react to form one or multiple products. Chemical reactor 10 is configured to provide conditions for a wide variety of chemical reactions, for example, by controlling temperature, pressure, geometry, flow profile, and/or other characteristics associated with thermal and mass transfers in reactor 10.

Referring to FIGS. 2-5, chemical reactor 10 includes multiple reaction chambers 200 in which one or more reactions are performed, and a pressurization space 111 that is capable of being in fluid communication with the reaction chambers. As described in detail below, when a predetermined condition is satisfied (e.g., when pressure in reaction chambers 200 exceeds a threshold pressure), chemical reactor 10 is configured to place chambers 200 and pressurization space 111 in fluid communication (e.g., to vent excessive pressure in the reaction chambers).

Figures 5, 6:
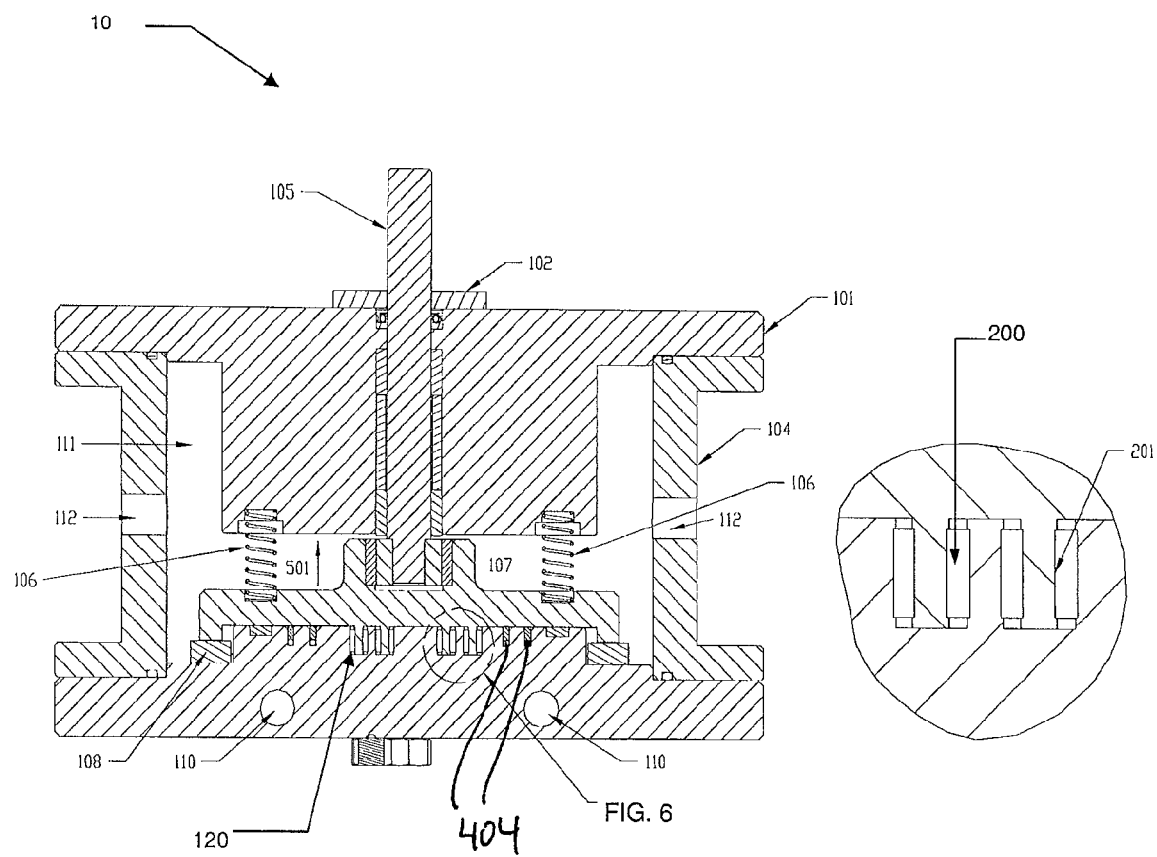
FIG. 5 is a side sectional view of the reactor shown in FIG. 2, taken along line segment 5-5.
FIG. 6 is a detailed view of FIG. 5 that shows the structure of walls of the reactor.
Figure 7A:
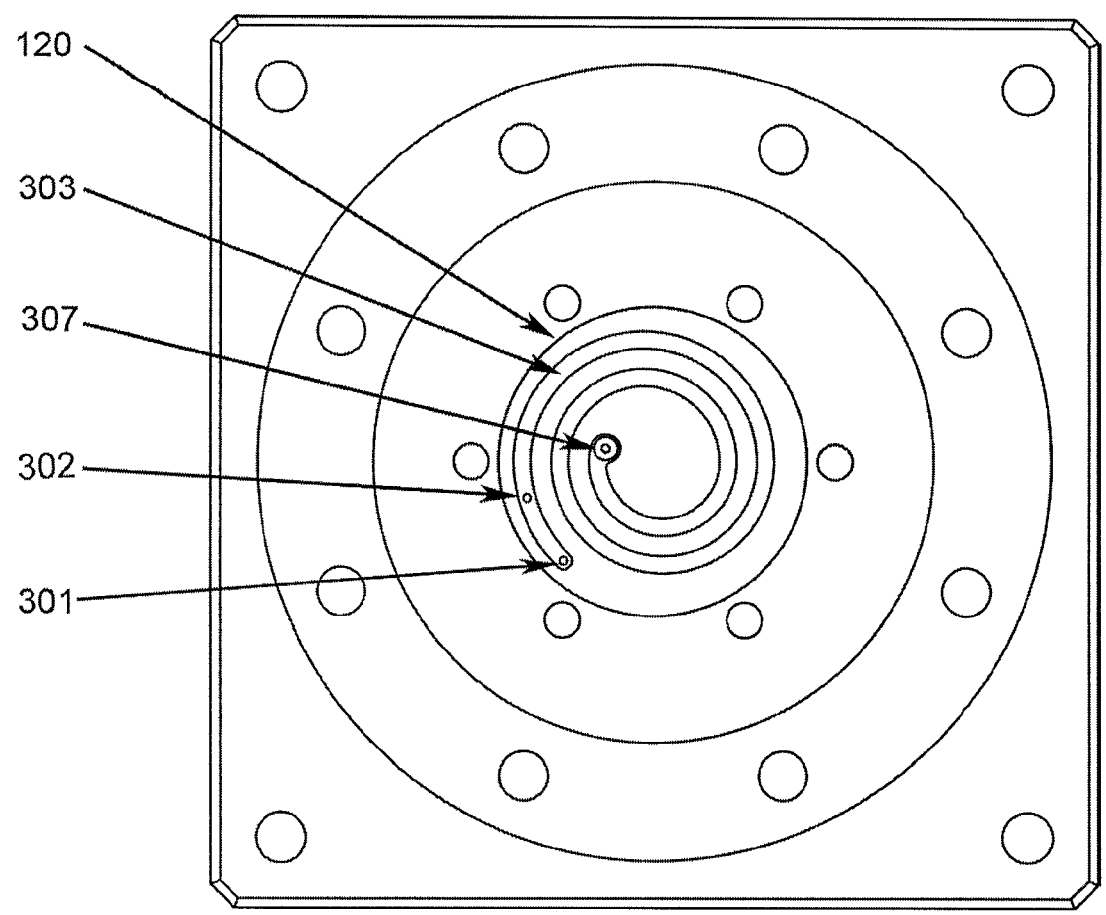
FIG. 7A is a top view of a stationary element.
Figure 7B:
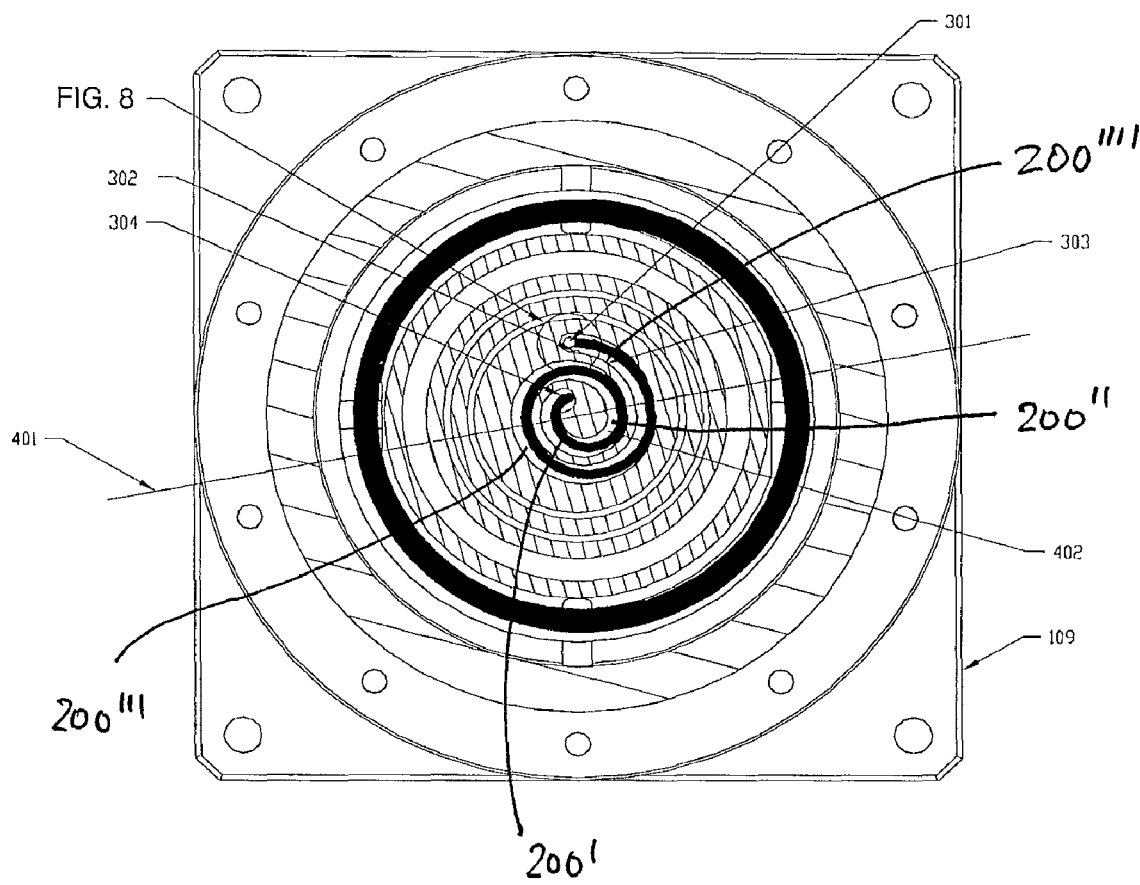
FIG. 7B is a top sectional view through the reactor shown in FIG. 3.
Figure 8A:
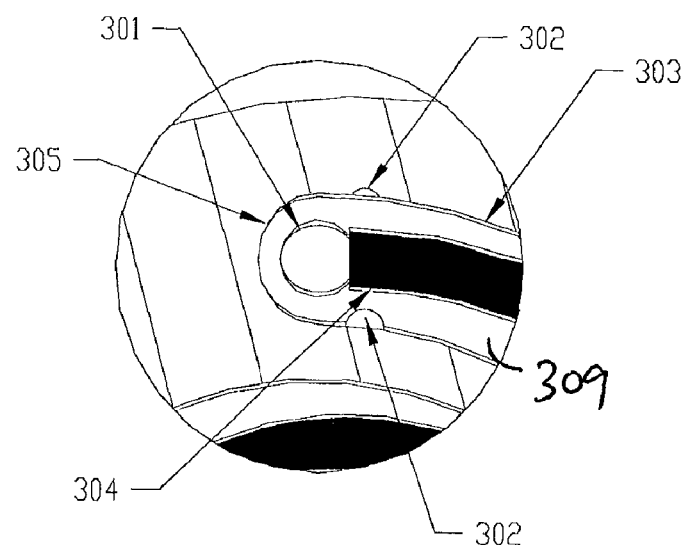
FIGS. 8A, 8B and 8C are detailed top sectional views of an inlet end of the reactor shown in FIG. 7B at three different relative positions of movable and stationary elements.
Figure 8B:
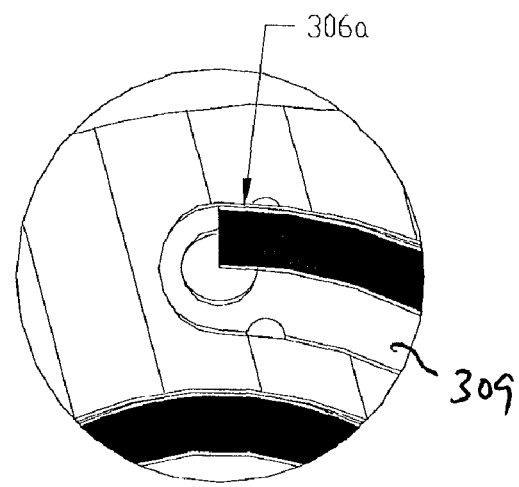
Figure 8C:
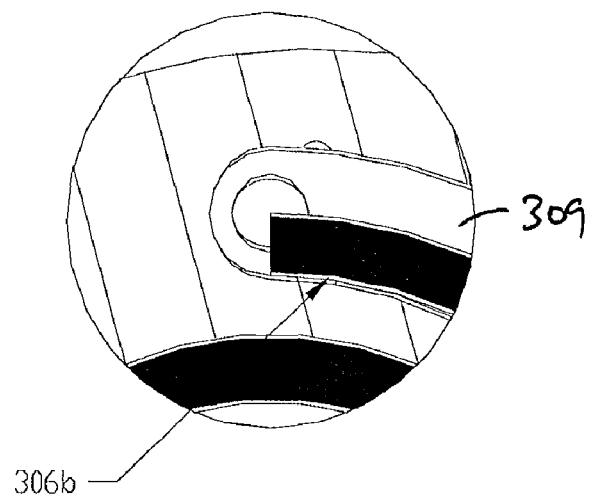

Reaction chambers 200 have geometries that are re-configurable to enhance the reactions(s) performed in the chambers. Referring also to FIGS. 6 and 7, reaction chambers 200 are defined by a stationary element 120 and a movable (e.g., rotatable) element 107. As shown, stationary element 120 has a stationary spiral wall 303, and movable element 107 has a movable (e.g., rotatable) spiral wall 304 that is asymmetric to stationary spiral wall 303 and is configured to engage with the stationary spiral wall to define reaction chambers 200. More specifically, stationary spiral wall 303 forms a spiral channel 309 within which movable spiral wall 304 fits and moves. Spiral walls 303, 304 can engage in such a way that multiple reaction chambers 200 or volumes can be defined between areas where the spiral walls contact and form a flank seal, thereby isolating the chamber between the contacted areas or flank seals. As an example, FIG. 7B shows four reaction chambers 200', 200'', 200''', and 200'''' defined by elements 120, 107. Spiral walls 303, 304 can have side profiles that are wholly or partially substantially straight, concave, or convex.

Reaction chambers 200 have variable volumes, depending on the direction of movement and position of movable element 107 relative to stationary element 120. As shown (e.g., FIG. 4), reactor 10 includes a rotational shaft 105 that is coupled to movable element 107 by an eccentric bearing 116. Shaft 105 is connected to a driver (not shown) that is capable of moving (e.g., rotating) movable element 107. Reactor 10 further includes a coupling 108 (such as an Oldham coupling) between movable element 107 and stationary element 120. In operation, the driver moves shaft 105, which moves movable element 107 relative to stationary element 120, and coupling 108 constrains the movement of the movable element to a selected path.

Figure 9A:
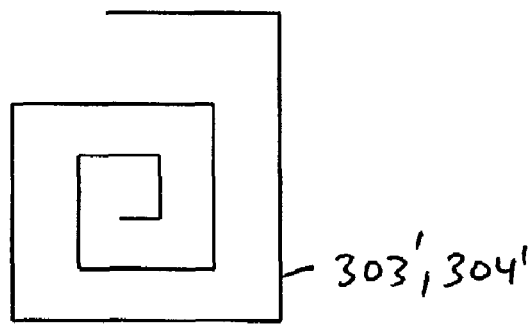
FIGS. 9A, 9B and 9C show embodiments of the movable and stationary elements shown in FIG. 7B.
Figure 9B:
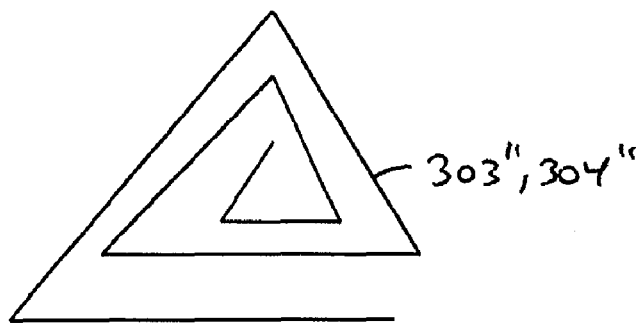
Figure 9C:
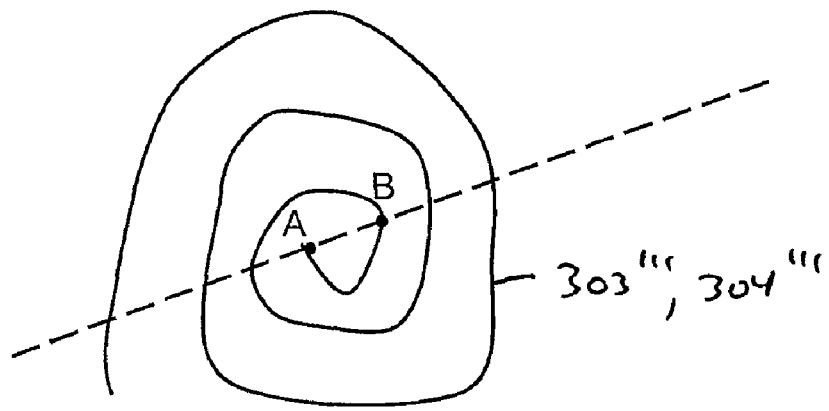

Other configurations for defining reaction chambers 200 can also be used. FIGS. 9A, 9B and 9C show some configurations of walls (303', 303", 303''', 304', 304", 304''') that can be used with stationary and/or movable elements 120, 107. Examples include involutes and spirals of lines, various two-dimensional shapes (e.g., regularly or irregularly polygonal having three sides (e.g., a triangle), four sides (e.g., a square, a rectangle, a rhomboid), five sides, six sides, seven or more sides; circular, oval, or elliptical) and three-dimensional shapes (e.g., helical). In some embodiments, stationary and/or movable elements 120, 107 have an asymmetric wall that connects a point A and a point B, and extends more than 180° around point A, as shown in FIG. 9C. Further, the wall may cross an imaginary line through points A and B at least once (e.g., two times, three times, four times, five times or more) on each side of point A. As shown in FIG. 9C, the wall crosses the imaginary line three times on each side of point A.

Referring to FIG. 6, in some embodiments, the walls of movable element 107 include narrow channels 201 aligned with corresponding channels in walls of stationary element 120. Channels 201 provide room for catalysts or light elements (e.g. optical fibers) to be mounted, as discussed below.

Figure 3:
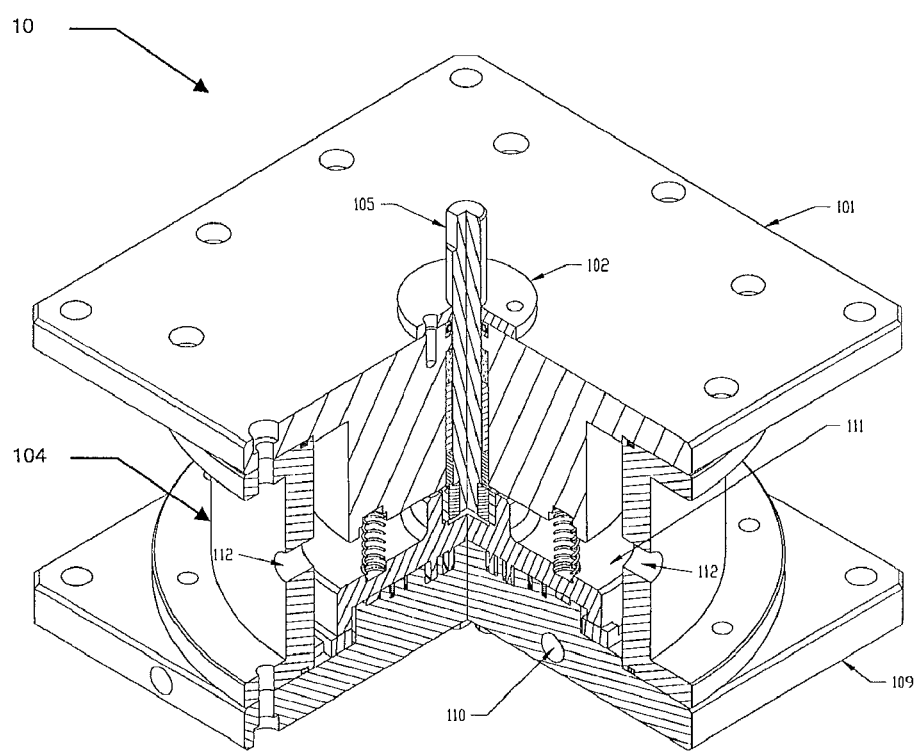
FIG. 3 is a perspective view of the reactor shown in FIG. 2, showing a cutaway section through the reactor to expose planes containing line segments 3-3.

In addition to having stationary spiral wall 303, stationary element 120 is configured to allow reactants from sources 12, 14 to be introduced into reaction chambers 200, and to contain chemical reactions between stationary element 120 and movable element 107. Referring also to FIGS. 7A, 8A, 8B, and 8C, stationary element 120 includes inlets 301, 302 that are in selective fluid communication with first and second sources 12, 14 and through which the first and second reactants are introduced into reaction chambers 200. Inlets 301, 302 can be arranged to provide an even distribution of reactants on spiral walls 303, 304. As shown, inlets 302 allow reactants to be introduced through small openings in inner and outer sidewalls of spiral channel 309 defined by stationary spiral wall 303. As shown, these small openings are placed near an inlet end 305, and inside positions 306a and 306b at which the outer end of movable spiral wall 304 makes contact with stationary spiral wall 303. Each time movable spiral element 304 passes near inlets 302 on the sidewalls of stationary spiral element 303, reactants can be pushed ahead of a progressing flank seal and spread into a thin film over the entire surface of spiral walls 303, 304. An outlet 307 (shown in FIG. 7A) may be positioned near a wall of stationary spiral wall 303 to gather reaction product(s) and any remaining reactant(s). Referring particularly to FIGS. 3, 5, and 7B, stationary element 120 further includes one or more races 113, 114 (as shown, two circular channels), and one or more seals 404 (e.g., sealing bearings and/or thrust bearings) in the races. When stationary and movable elements 120, 107 are engaged during use, seals 404 also contact and engage with movable element 107 to reduce or to prevent fluid flow into and out of reaction chambers 200.

In some embodiments, reactor 10 (e.g., elements 120, 107) is constructed so that the reaction(s) in reaction chambers 200 do not contact any lubricant. Seals at line contact 401 are properly selected to avoid breakdowns that can affect reactor performance over time, and to avoid contaminating the reaction. For example, self-lubricating materials can be used for bearing 115 of movable element 107, thrust bearing and axial face seals 404 mounted in races 113, 114, coupling 108 and other seals and bearings in reactor 10. Examples of self lubricating materials include Teflon©, glass-filled Teflon©, and polyimides, graphite, filled-Viton©.

Figure 4:
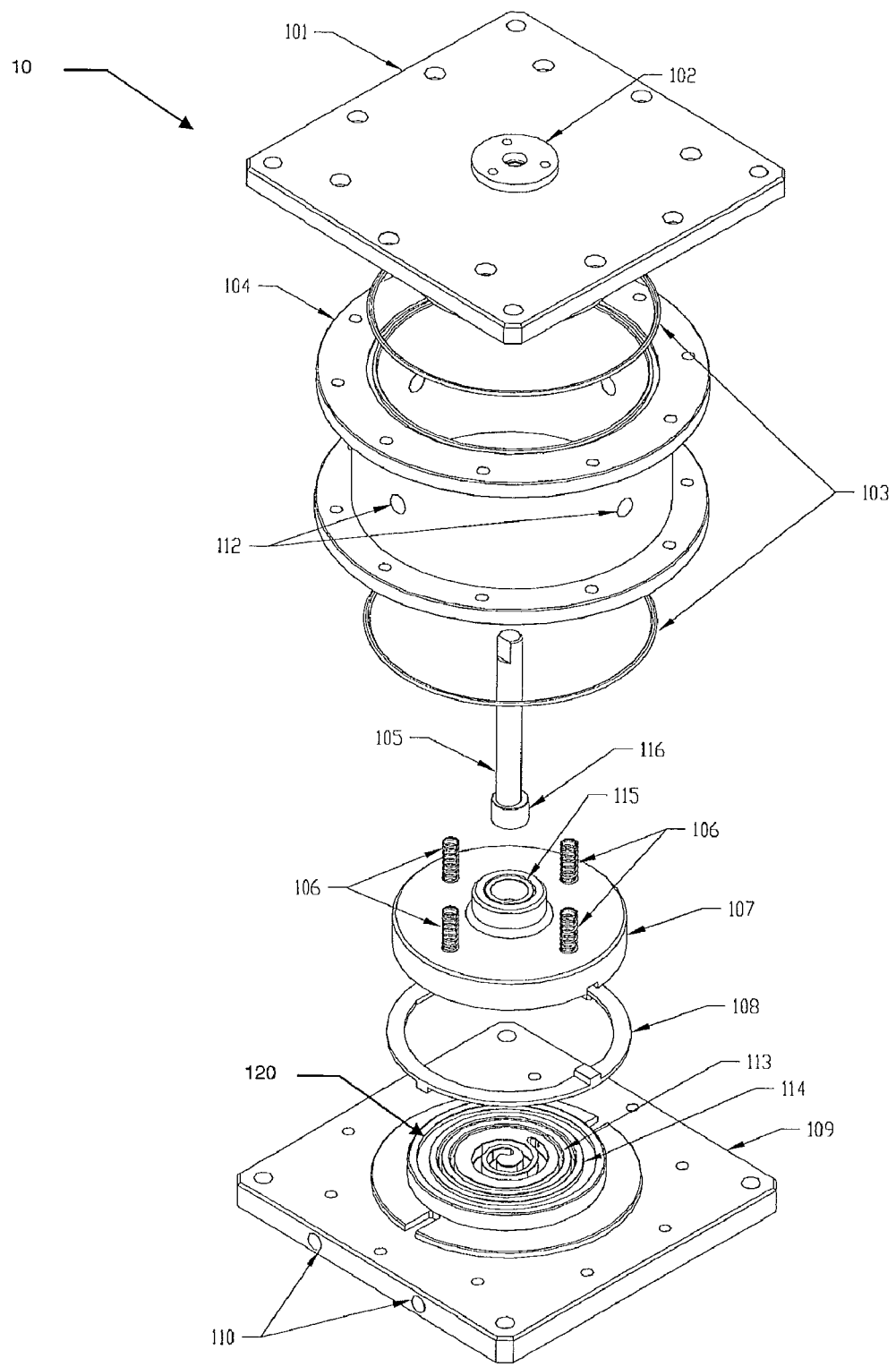
FIG. 4 is an expanded view of the reactor shown in FIG. 3.

Referring particularly to FIG. 5, pressurization space 111 is configured to dilute a reaction mixture in reaction chambers 200, for example, in the event of a run-away or uncontrolled reaction and the pressure in reaction chambers 200 exceeds a predetermined pressure. Referring also to FIGS. 3 and 4, pressurization space 111 is defined by a top plate 101, a bottom plate 109 that includes stationary element 120, and a cylindrical chamber housing 104 between plates 101, 109. Plates 101, 109 are sealed to chamber housing 104 by polymer members 103 (such as elastomeric O-rings) and multiple bolts (not shown). As shown, top plate 101 receives shaft 105 and captures the shaft with a seal plate 102, while still allowing the shaft to move (e.g., rotate) movable element 107. Bottom plate 109 includes channels 110 that can be used for controlling the temperature of the reaction(s) in chambers 200, for example, by circulating a heating/cooling fluid or accommodating heating cartridges. Chamber housing 104 includes multiple openings 112, each of which can serve as an inlet port, an outlet port, or a pressure sensing port (e.g., by being in fluid communication with a pressure transducer). Openings 112 allow a pressurization fluid (e.g., nitrogen, argon, oil) to flow though pressurization space 111 at a regulated pressure and flow rate. As shown, within pressurization space 111, reactor 10 further includes springs 106 engaged with top plate 101 and movable element 107. Springs 106 can help seal movable element 107 to stationary element 120, but at the same time, the springs allow the movable element to move to reconfigure reaction chambers 200 and to lift away from the stationary element of the pressure in the reaction chambers 200 exceeds a selected amount.

In operation, the first and second reactants are introduced into reactor 10 through multiple inlets to form one or more products. After the selected amounts of reactants are introduced into reactor 10, fluid communication between the reaction chamber and first and second sources 12, 14 may be stopped. The reactants, once in the reaction chamber in fluid communication with the inlets (the "first chamber"), are allowed to react. Next, movable element 107 is moved (e.g., rotated) to isolate the first chamber from the inlets by contacting portions of stationary and movable spiral walls 303, 304, and to form a "second chamber" containing the reactants (and possibly product(s)). Movement of movable element 107 also forms a new first chamber in fluid communication with the inlets, and the first and second reactants can be introduced into this new first chamber to react. Fluid communication between the new first chamber and first and second sources 12, 14 can then be stopped. The preceding process can be repeated. As a result, movable element 107 can be moved to isolate the reaction chamber in fluid communication with the inlets, and to move reactants and product(s) in the nth chamber (e.g., most centered chamber) toward the outlet. The product(s) are moved from reactor 10 to an awaiting container.

In the event of a run-away reaction in which significant over pressure develops (e.g., the pressure inside reaction chambers 200 exceeds a predetermined pressure), the pressure in the reaction chamber can force movable element 107 and stationary element 109 apart axially (in the direction of arrow 501) and vent the contents of reaction chambers 200 into pressurization space 111. In embodiments in which pressurization space 111 contains an inert gas, the gas can dilute and quench the reaction, without contributing any reactants to the reaction. As a result, use of inert gas in pressurization space 111 provides the ability to contain the effects of a run-away chemical reaction.

While a number of embodiments have been described, the invention is not so limited.

For example, in other embodiments, stationary and movable elements 120, 107 together define only one reaction chamber in fluid communication with one or more inlets and outlets. The reaction chamber can be sealed from the reactant source(s) and the outlet(s) by valves.

In some embodiments, only one reactant is introduced into the reactor to form one or more products. For example, to form the product(s), the reactant can react with one or more catalysts in the reaction chamber(s) (described below), and/or can react photochemically within the reaction chamber(s) (also described below).

2. Performing Reactions Under Controlled Environments

Embodiments of reactor 10 and systems 15 can be used in many applications. One application, for example, is to provide controlled environments for chemical reactions. The efficiency of a chemical reaction can depend on the conditions under which the reaction take places, including conditions such as temperature, pressure, rates of heat transfer and mass transfer, rates of contact and/or mixing between reaction components. Many control techniques can be used in conjunction with reactor 10 and system 15 to provide one or more selected reaction conditions. Some examples are described below.

2.1 Flow Control

As previously described, reaction chambers 200 of reactor 10 are defined at least in part by the positioning of stationary and movable elements 120, 107 and their walls. As movable element 107 moves with respect to stationary element 120, the size and/or shape of reaction chambers 200 may change accordingly. Further, this relative motion may shift line contact 401 between stationary and movable elements 120, 107 and generate turbulence (e.g., micro-eddies) within reaction chambers 200 and large near-wall shear forces. The turbulence and large shear forces can help improve the efficiency of mixing different reaction components, and increase the rates of heat and mass transfer.

To provide desired flow patterns in reaction chambers 200 that facilitate reactions, a driver can be coupled to rotational shaft 105 to control the movement of rotating element 107. The speed of the driver and the flow conditions in reaction chambers 200 (e.g., flow rate, flow pattern, component viscosities) can influence the mixing characteristics of reactor 10. For example, in embodiments including spiral configurations, the driver can move movable spiral wall 304 in an orbiting fashion around an inlet of reaction chambers 200, for example, with a fixed orbit radius and a small flank clearance. As shown by some computational fluid dynamic (CFD) simulations, near-wall shear rate can be as high as 500,000 $s^{-1}$ for a reactant such as water flowing at a rate of 143 milliliters per minute with the reactor's movable element orbiting at 100 revolutions per minute. In some embodiments, rotational shaft 105 can be replaced by a rotary or orbital motor that can be mounted inside housing 104 without using a shaft seal. The driver can be remotely speed controlled.

2.2 Temperature Control

The temperature of reactor 10 can be controlled through heat exchange between reaction chambers 200 and an external heat source (e.g., a thermal or an electric heat source). The running temperature of a reaction can be detected in real time, for example, by thermocouples, and compared with a target temperature by a temperature regulator (e.g., a proportional-integral (PI) regulator) to determine the amount of heat exchange needed to facilitate the reaction. Heat exchange can be provided through circulating a heating/cool fluid via channels 110 on bottom plate 109 (shown in FIG. 3) or through a heat cartridge.

2.3 Pressure Control

As shown in FIG. 5, pressure is applied to force movable element 107 firmly onto seals 404 (e.g., thrust bearings) of stationary element 120, so that the movable element moves (e.g., orbits) with respect to the stationary element with minimum friction and wear. This force can be accomplished, for example, by applying a pressure gradient (e.g., approximately two bars) between the gas pressure in pressurization space 111 and the pressure within reaction chambers 200. Compression springs 106 can also apply an additional amount of axial force on movable element 107 for sealing.

In some embodiments, reactor 10 is equipped with a differential tracking back pressure regulator connected to maintain pressurization space 111 at a pressure that is greater than or equal to the pressure at inlets 301, 302 or outlet of the reactor. The differential tracking back pressure regulator can be set so that the pressure of channel 309 is less than that in pressurization space 111.

For some chemical reactions, the pressure inside reaction chambers 200 may fluctuate during the course of the reactions, for example, as a result of newly formed gaseous products. The differential tracking back pressure regulator may be configured such that, so long as the pressure inside reaction chambers 200 does not exceed a predetermined threshold, a steady pressure gradient is maintained across pressurization space 111 and reaction chambers 200.

As indicated above, in the event of an undesired or sudden pressure surge, reactor 10 also provides an expansion volume to prevent damage, for example, from an uncontrolled reaction. Particularly, should pressure in reaction chamber 200 exceed the combined axial pressure exerted by springs 106 and the pressure maintained in pressurization space 111, movable element 107 lifts away from stationary element 120 in the direction of arrow 501. As the reaction mixture vents into pressurization space 111, excess pressure is released. When the pressure inside reaction chambers 200 falls below a threshold pressure, movable element 107 is forced back against seals 404 mounted in stationary element 120. Portions of the reaction(s) that vent into pressurization space 111 are diluted by the contents in the pressurization space, for example, a chemically inert gas (such as nitrogen and argon). Through an exit port (e.g., one of ports 112 of chamber housing 104), a flow of inert gas can then carry the vented and diluted mixture to a hood, flare or scrubber, which further dilutes or treats the vented mixture.

2.4 Temporally and Spatially Varying Reactant Concentrations

Some chemical reactions performed under continuous flow conditions are conducted under steady state. In some embodiments, steady state conditions are used to achieve good productivity and/or selectivity. For example, chemical concentration(s) at the inlet(s), pressure, photon fluxes and temperature can be maintained at levels that have been determined to provide selected levels of conversion and/or selectivity to the desired products.

In reactor 10, the conditions in reaction chambers 200 may vary according to the movement of movable element 107 (e.g., vary periodically at a frequency related to the rotation frequency of the movable element). Therefore, conditions (e.g., optimal conditions) for concentration(s) at the inlet(s) and/or pressure may not correspond to a steady state ratio of the reactant(s) or a constant pressure. As a result, the optimal conditions may involve varying (e.g., periodically) ratios of the reactant(s) and/or changing (e.g., periodically) pressure.

Reactor 10 can be operated to obtain higher productivity and/or selectivity by controlling conditions at the inlet(s). For example, the direct reaction of hydrogen and oxygen to form hydrogen peroxide ($H_2 + O_2 \rightarrow H_2O_2$) is known to have a higher selectivity to hydrogen peroxide given a larger $O_2:H_2$ ratio. With appropriate valves and gas supplies, the composition(s) at the inlet(s) to reactor 10 can be controlled to alternate between lean (excess oxygen) and rich (excess hydrogen) conditions, so as to provide high $O_2$ concentrations and to regenerate an oxidized surface prior to the introduction of hydrogen. These cyclic conditions can be arranged to achieve at least comparable throughput as associated with steady flow of a stream containing a large $O_2:H_2$ ratio.

Additionally or alternatively, reactant(s) can be introduced through discrete inlet(s) located at multiple site(s) along a movement path of movable element 107. For example, additional reactant(s) can be introduced through one or more inlet ports, e.g., spaced at 25%, 50% and 75% of the distance from the inlet(s) to the outlet to maintain reactant concentrations in reaction chambers 200 at a selected level while previously introduced reactants are consumed during the reaction. With valving (e.g., by adding a set of remotely controlled valves), the reactant(s) can be introduced and/or product(s) can be removed at times coordinated with the movement of movable element 107.

2.5 Examples of Chemical Reactions

The reactors described herein can be used to effect nearly any chemical reaction, including, but not limited to, those that involve: addition, substitution, elimination, oxidation and reduction, and/or isomerization. The reactors can be used to perform reactions that require or particularly benefit from excellent mass transfer. One class of such reactions is multiphase reactions that benefit from intimate mixing and very large surface areas. Another class of such reactions includes extraction unit operations where one or more components of a multi-component solution are transferred into a second, immiscible, solvent to effect a separation. The reactors can also be used for reactions that require or particularly benefit from high heat transfer, such as highly exothermic or endothermic reactions. The reactor can also be used for hazardous reactions where just-in-time preparation of hazardous intermediates increases safety, reactions that benefit from being conducted at high pressures, and reactions that take advantage of more than one of the properties described herein.

As an example, transesterification of soybean oil with methanol and catalytic sodium hydroxide to make fatty acid methyl esters is a two-phase reaction that involves good mixing and high interfacial surface areas to proceed at good rates and with good yields. For example, sodium hydroxide can be dissolved in methanol from approximately 0.2 to approximately 1M (e.g., from approximately 0.3 to approximately 0.7 M, or from approximately 0.4 to approximately 0.5 M). The soybean oil and methanol solution can be fed into the reactor through separate inlet ports. Total flow rates can be from approximately 1 to approximately 200 mL/min (e.g., from approximately 5 to approximately 100 mL/min, or from approximately 5 to approximately 20 mL/min). The ratio of methanol to soybean oil can be at least approximately 3 to 1 (e.g., approximately 6 to 1). The scroll displacement rate can be from approximately 1 to approximately 200 revolutions per minute (RPM) (e.g., from approximately 40 to approximately 120 RPM). The ratio of total flow to displacement can be from approximately 0 to approximately 1 (e.g., from approximately 0 to approximately 0.2). The reactor can be held at a temperature from approximately room temperature to approximately 90° C. (e.g., from approximately 40 to approximately 70° C., or from approximately 60 to approximately 70° C. The reactor pressure can be from approximately one atmosphere to approximately 20 atmospheres (e.g., from approximately one atmosphere to approximately 5 atmospheres, or from approximately one atmosphere to approximately 2 atmospheres). The effluent from the reactor can be cooled with a cold-water heat exchanger to stop or slow the reaction before conventional work-up and analysis.

Another example includes extraction for purification involving removal of residual $H_2S$ from mercaptanized soybean oil (MSO). MSO can be prepared photochemically from soybean oil in the presence of a large excess of $H_2S$. For safety and aesthetic reasons, unreacted $H_2S$ is substantially removed from the product, but MSO can be a very viscous material, which can make it a difficult material to extract. Methanol can be used to extract $H_2S$ from MSO using the disclosed reactors. For example, MSO and methanol can be fed separately into a reactor with total flow rates from approximately 1 to approximately 200 mL/min (e.g., from approximately 5 to approximately 100 mL/min). The volume ratio of methanol to MSO can be from approximately 0.5 to approximately 1.5. The scroll displacement rate can be from approximately 1 to approximately 200 RPM. The ratio of total flow to displacement can be from approximately 0 to approximately 1. The reactor can be held at a temperature from approximately room temperature to approximately 90° C. The reactor pressure may not be critical in this example, but elevated pressures can be used at higher temperatures, for example, to keep the methanol from vaporizing. The effluent from the reactor can be allowed to settle, and the two can be separated. Removal of $H_2S$ can be confirmed by analysis of the methanol phase, and/or by measurement of residual $H_2S$ in the MSO.

Other examples include reactions between organometallic materials and organic compounds. More specifically, Grignard reactions can include an organometallic material and a carbonyl functionality that involves intimate mixing of reactants, tight temperature control, and short reactor residence times to reduce by-product formation. High heat and mass transfer rates can promote liquid homogenization and heat dissipation in the reactor. One example is the reaction of thiolactone ((+)-cis-1,3-dibenzyl-hexahydro-1H-thieno[3,4d]imidazole-2,4-dione) and 1,4-(dichloromagnesium)-butane in tetrahydrofuran in the reactor and further processed in $CO_2$ and xylene/$H_2SO_4$ to form a D-(+)-biotin intermediate, e.g., for pharmaceutical applications. Flow rates can be from approximately 2 to approximately 5 L/hr or from approximately 5 to approximately 30 kg/hr for each reactant, with a concentration ratio of $C_{organometallic}:C_{carbonyl}$ ranging from approximately 2:1 to approximately 1.5:1. Some parameters include operating temperatures of from approximately −40° C. to approximately 120° C., a maximum pressure of approximately 4.5 bar, and reactor residence times less than approximately 10 seconds.

In some embodiments, the reactors can be used to conduct continuous polymerizations reactions. An example of this type of reactions is a suspension polymerization, or copolymerization, of vinyl chloride monomer in water. The reactors enable the use of very fast reaction initiators so that very high efficiency can be obtained. The reactors can also provide uniform shear so that a very uniform final polymer particle size can be obtained. Diisobutanoyl peroxide is an example of a very fast initiator and vinylidene chloride, vinyl acetate, ethylene and propylene are examples of comonomers. The reactors can also allow the initiator feed level to be varied though the reaction to adjust the properties of the final polymer and the amount of residual monomer in the product.

The reactors can be used for continuous production of emulsions. For example, first source 12 can be used to feed one liquid component to a reactor, and second source 14 can be used to feed another liquid component to the reactor. One of the feeds may also contain an emulsion aid or stabilizer. The two liquid components can be normally immiscible, but the shear mixing forces in the reactor are highly uniform and can provide an emulsion of highly uniform particle size. The emulsion can be of the oil-in-water type or the water-in-oil type, and the specific type can depend on the mass ratios of the components and the type of stabilizer that is used. The types of oil component can be, for example, mineral oils, vegetable oils, and silicone oils. The water component can be pure water or water-containing emulsifying additives and rheology modifiers such as water-soluble polymers. Either phase can contain additional chemicals. For example, one phase can be a molten adduct of magnesium dihalide-Lewis base and the other phase can be an aromatic hydrocarbon liquid. The particle size uniformity can be superior to that obtained by some stator-rotor devices, possibly in part because of the highly uniform shear field experienced by the fluid components as they continuously pass through the reactor.

3. Performing Catalytic Reactions

A catalyst (e.g., a heterogeneous catalyst) can be used to increase rates and to decrease activation energy of chemical reactions. Catalysts containing active surfaces as films can be placed in reaction chambers 200 (e.g., applied to the walls (e.g., spiral walls 303, 304) of reactor 10).

Catalysts may be prepared from precursors that are soluble in solvents that also dissolve the polymeric films, or unset polymeric precursors (such as tetrahydrofuran). For example, a series of catalyst structures (e.g., films) can be prepared by intimately mixing aqueous, colloidal suspensions of nanometer-sized particles of a Pt/Pd alloy with a two-part silicone rubber that also contains a quantity of a mixture of acetone and ethanol to form a viscous mass. The mass can be spread into a film, for example, using a doctor blade. The film can be placed in an oven pre-heated to 110° C. for 1 hour both to rapidly evaporate the acetone/ethanol mixture and to accelerate setting of the film. The rapid evaporation of the acetone/ethanol mixture can create small bubbles in the film that provide channels that can increase access to and contact with the Pt/Pd alloy particles. The films can be either skived into sections or used as prepared, depending on their thickness.

Figure 10:
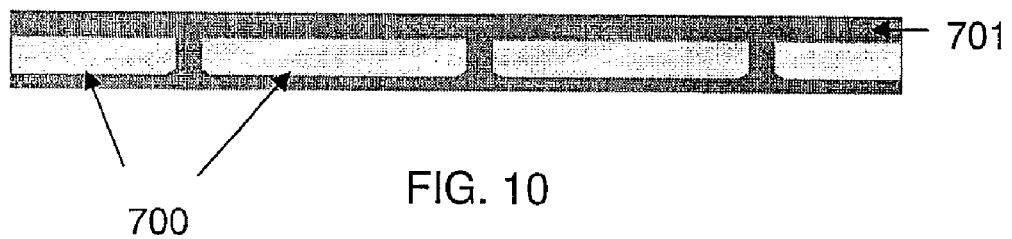
FIG. 10 shows an embodiment of a holder that can be used to mount a catalyst inside a reactor.

Catalytic films can be fixed within reaction chambers 200 by mechanical means. For example, as shown in FIG. 10, in some embodiments, a catalyst film 700 can be cast directly onto slotted strips 701 that have been mounted on a die so that a portion of the film extrudes through the slots and forms transverse plugs and a backing structure that rivets the film to the strip once the film has set. As another example, the films can be mounted in chambers 200 (e.g., on spiral walls 303, 304), for example, using double-sided adhesive tape. Other examples include spring clips that press the films against the walls of reaction chambers 200, transverse bails that prevent the films from leaving the reaction chambers and/or slipping along the reaction chambers, and rigid carriers on which the films adhere.

A catalyst film can also be mounted in reactor 10 by attaching the films to a deformable strip. Once the film is attached, the deformable strip can be coiled into a helix whose relaxed radius is greater than that of channel 309. When the coil is inserted into a channel, it can remain in place because of forces that oppose its relaxation. Additional immobilization can be provided by clips, pins, bails or other mechanical fasteners. In particular, the strip can be equipped with tabs that mate with corresponding slots machined into the walls of stationary and/or rotating elements 120, 107.

Attaching the catalyst films depends on the conditions of use and the dimensions of reactor 10. For example, for operating temperatures from approximately −30° C. to approximately 250° C., the catalyst film can be fabricated from a polymer (e.g., an elastomer such as silicone rubber). For operating temperatures that are higher or for use with reactions that may swell or degrade a polymer (e.g., silicone rubber), a catalyst film can be prepared by wash coating a catalyst layer on a rigid carrier using inorganic cements, such as alumina and silico-aluminates.

4. Performing Photochemical Reactions

Some chemical reactions can be initiated and/or facilitated by light (i.e., photons), which are absorbed by the reactant(s) and/or catalyst(s) and excite electrons to high energy states. With sufficiently energetic photons, the absorption of light can lead to bond breakage. One example is photo-initiation of chain reactions, in which free radicals, produced by photolysis of an initiator, participate in a large number of propagation cycles.

Figure 11B:
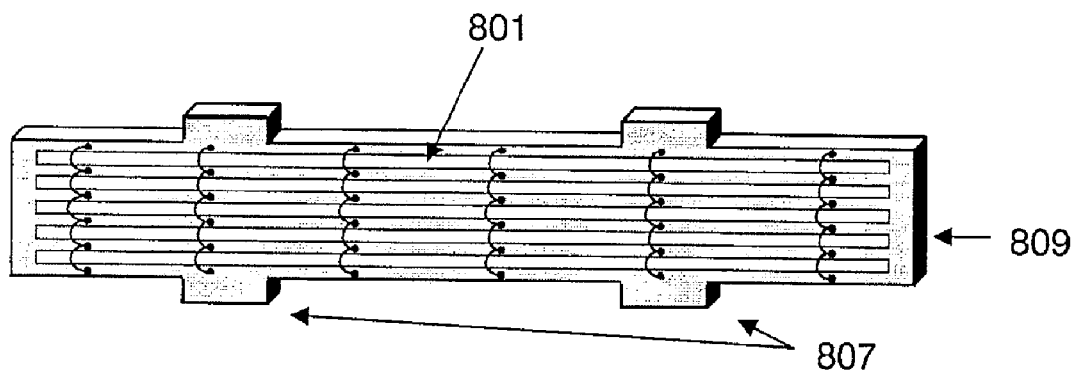
FIGS. 11B and 11C show an embodiment of a holder that can be used to mount optical elements inside a reactor.
Figure 11C:
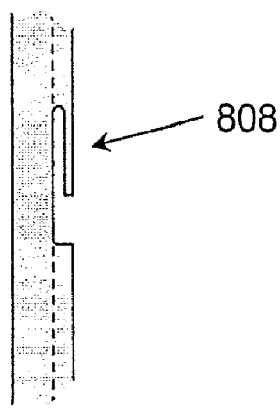
Figure 11A:
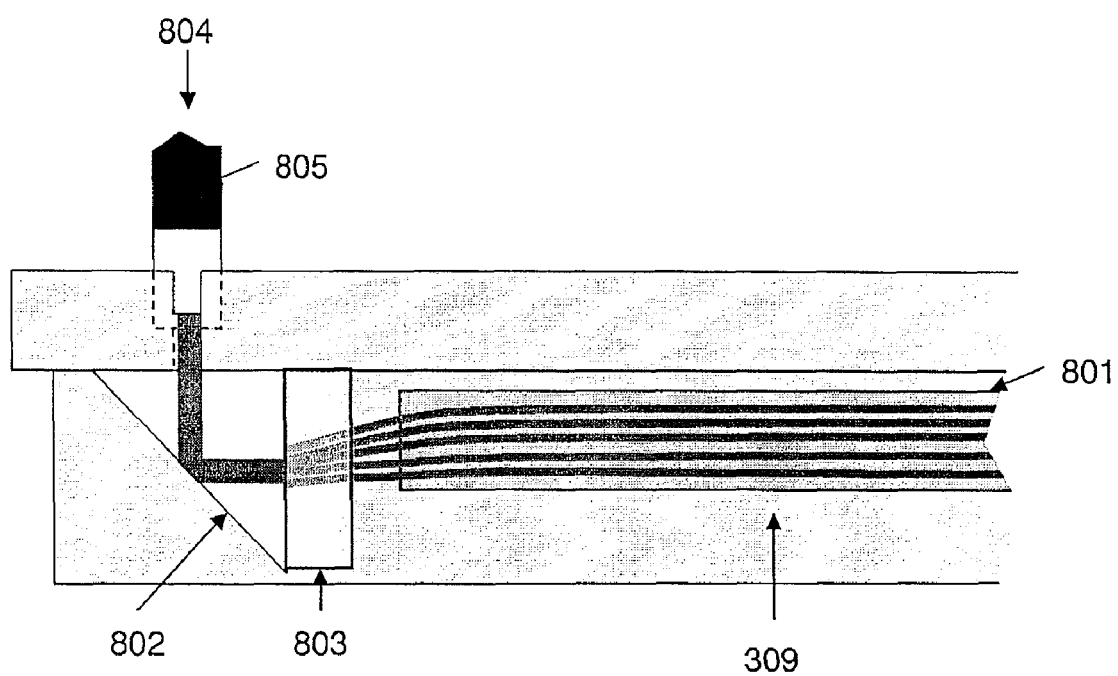
FIG. 11A is a schematic side view of an arrangement of components that can conduct light into fiber optics mounted inside a reactor.

Referring to FIG. 11, reactor 10 equipped with side-emitting fiber optics 801 (or other optical elements such as side-emitting optical ribbons) can be used as a continuous reaction vessel for photochemistry. For example, fiber optics 801 that have been laid into channels 309 of stationary spiral element 120 can be lit by directing light from an external light source 804 through a prism 802 that communicates with polished ends of fiber optics 801. External light source 804 can be conducted to reactor 10 through a fiber optic bundle 805, as illustrated, or by means of lenses and/or mirrors. The polished ends of fiber optics 801 can be mounted in a fiber mount 803 that positions them to receive incoming light. As shown, by fixing fiber optics 801 into channel 309 along all or some of the length of stationary spiral wall 303, a reaction mixture can be brought very close to light from source 804 while the mixture traverses reaction chambers 200. Fiber optics 801 can be mounted on preformed, appropriately sized strips 809 that can be curved to fit inside channel 809 on the walls of stationary rotating elements 120. Strips 809 can be made of a metal that conforms to the walls of stationary and rotating elements 120, 107 and that can be fixed in place using bails, pins or a set of interlocking tabs 807 and slots 808. Fiber optics 801 can be mounted to the strips mechanically or through the use of adhesives.

Fiber optics 801 can be fabricated from quartz or other non-reactive materials. In some embodiments, the fibers themselves and/or the walls of reaction chambers 200 are coated with a photocatalyst to further enhance reaction rates. The loss of light through the walls defining reaction chambers 200 can be controlled by roughening the walls to change the angle of incidence of the photons with respect to the interface between the reaction mixture and the fibers, by equipping the fibers with a gradient coating and/or by including scattering centers in the bulk of the fibers to induce scattering rather than propagation as the photons travel down the fibers. Propagation of light from the fiber optics into the reaction mixture can be enhanced by reducing a difference between the index of refraction of the fiber and that of the reaction mixture under reaction conditions.

In some embodiments, to perform photochemical reactions in reactor 10, stationary element 120 and/or movable element 107 are constructed from a material that is wholly or partially transparent to one or more incident wavelengths used in the photochemical reactions. For example, elements 120, 107 can be constructed from quartz, which is transparent to deep ultraviolet (UV) radiation. Examples of incident wavelengths include ultraviolet radiation, visible radiation (e.g., 400-700 nm), and infrared radiation. Other examples of transparent materials include fluorides (e.g., barium fluoride and calcium fluoride) and potassium bromide that are transparent to infrared radiation, while Vycor© and Pyrex© allow near UV radiation to pass. Stationary element 120 and/or movable element 107 can be wholly constructed from a transparent material, or only selected portions (such as those that define reaction chambers 200) can be constructed from the transparent material. In some embodiments, top plate 101, bottom plate 109, and/or cylindrical chamber housing 104 are constructed (wholly or partially (e.g., a window)) from a transparent material to allow incident wavelengths to reach a reaction mixture in chambers 200. As used in the context of photochemical reactions, "transparent" means incident radiation used during the reactions are allowed to pass, wholly or partially (e.g., at least approximately 25%, at least approximately 50%, at least approximately 75%).

Figure 12:
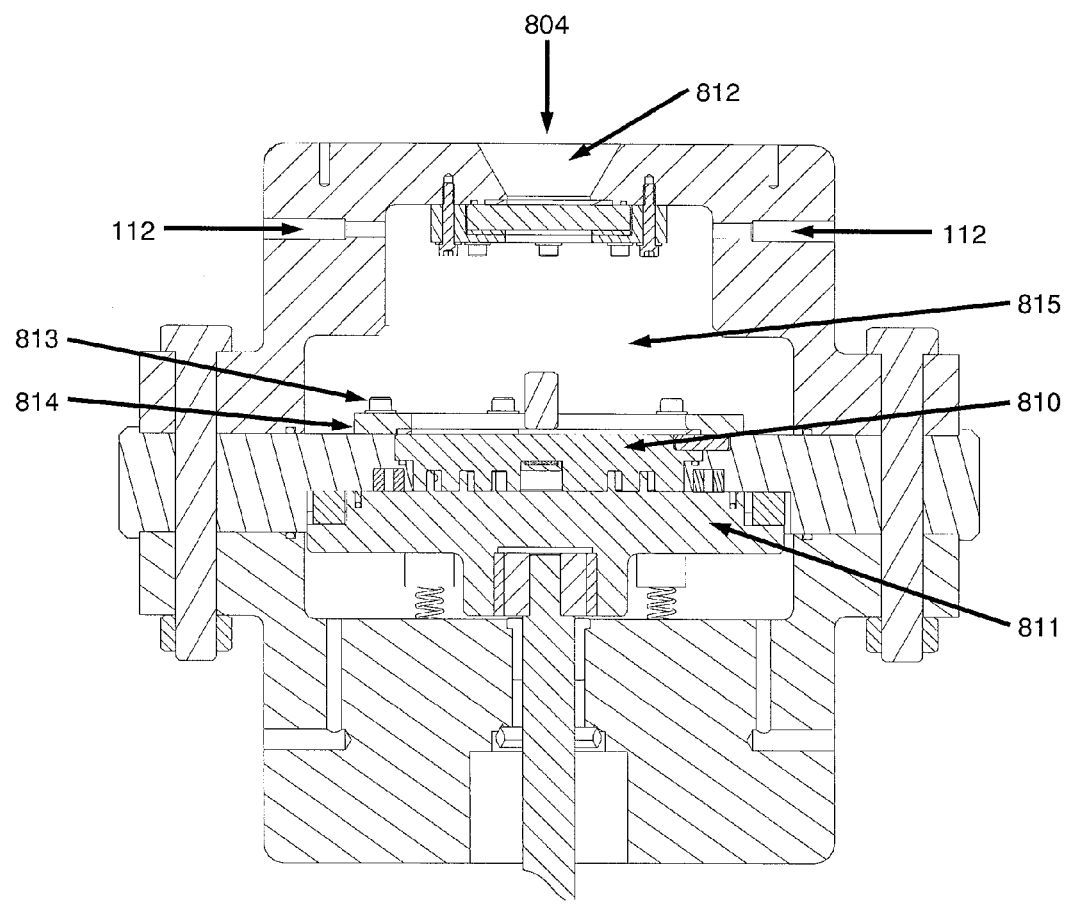
FIG. 12 is a side sectional view of an embodiment of a reactor.

Another example of a means of equipping reactor 10 for photochemical reactions is to make either the stationary element 120 or the movable element 107 out of a translucent material such as quartz. A light source 804 external to the reactor can then illuminate the reactant(s) and/or catalyst(s) in the reaction chambers 200. Referring to FIG. 12, light source 804 irradiates photons through a translucent window 812 attached to an upper housing 815 of the reactor system. As shown, upper housing 815 is decoupled and independent from a stationary element 810, which is manufactured from a translucent material such as quartz. This allows the photons emitted from light source 804 to pass through translucent window 812 and stationary element 810 into the reactants. Stationary element 810 is attached to upper housing 815 by a clamp ring 814 and screws 813. This representation of the reactor allows the stationary or orbiting elements 810, 811, to be swapped out with other elements made with different materials without re-fabricating upper housing 815.

The range of wavelengths of light can be properly selected to initiate the reactions of choice. In some embodiment, reactor 10 is coupled to a light source 804 that is capable of generating photons having multiple ranges of wavelengths. A controller coupled to light source 804 can select the desired range of wavelength for initiating the reactions. The controller is also capable of generating one or multiple doses of illumination in the reaction chamber, and determining the timing, duration, and amplitude of each dose. Examples of light sources include the sun, lasers, LEDs and lamps.

Examples of photochemical reactions include photochemical destruction of organic, inorganic, and biological materials as a contaminant disinfectant for air purification and wastewater treatment systems. Photochemical reactions can be particularly useful because they can operate under room temperature and pressure. UV radiation sources include mercury and xenon lamps, with the photon penetration depth from these lamps being dependent on the fluid absorptivity. The incorporation of a reactor made of quartz or other transparent material that allows UV transmission and a UV lamp external to the reactor can help promote photochemical destruction of contaminants because of good contact between the fluid medium and the reaction chamber walls, in addition to the creation of micro-eddies near the walls without significant pressure drop. A small-sized reactor can decrease the need for large photon penetration depths into the fluid. Moreover, photocatalysts such as titanium dioxide, zinc oxide, and cadmium sulfide, can be introduced into and/or immobilized in the reactor to facilitate destruction of contaminants. Potential air and water contaminants include volatile organic compounds such as formaldehyde, ethanol, trichloroethylene, methyl tert-butyl ether, and benzene, dyes such as Acid Orange 7 and Reactive Black 5, insecticides, pesticides, pharmaceuticals, and biomaterials such as $E.\ coli$. For example, photo-initiated sterilization of air contaminants can occur at room temperature and a fluid density of approximately 1.1911 kg/m$^3$, with fluid flow velocities from approximately 3 to approximately 7 m/s.

5. Pasteurization and Sterilization

Since reactor 10 can provide high rates of heat transfer, it can rapidly heat fluids to temperatures for the destruction or deactivation of microbes, without excessively high wall temperatures. Consequently, reactor 10 can render fluids safe to ingest without subjecting them to conditions deleterious to other characteristics, e.g., flavor. Examples of sterilization are provided above.

6. Cleaning Appliances Using In-Situ Generated Chemical Sterilizers

The compactness and safety of reactor 10 allow it to be used for applications in which harsh, caustic or otherwise hazardous chemicals can be produced from chemicals generally recognized as safe, with an input of energy.

One example is the generation of hydrogen peroxide from hydrogen and oxygen in an electrolyzer that is tightly coupled to reactor 10 in which hydrogen and oxygen are combined, possibly with additional oxygen from air. Cyclic operation of reactor 10 described above makes it possible to swing the reactor from rich (excess hydrogen) to lean (excess oxygen) to increase the production rate of the hydrogen peroxide.

7. Performing or Extracting Work in a Reactor

Since reactions chambers 200 can vary in geometry (e.g., increase and decrease in volume) reactor 10 may also serve as a compressor, an expander, a motor, or other means of performing work on a fluid, or extracting work from a fluid. For example, a reaction that generates a gaseous product, such as a combustion reaction, can be performed in reactor 10 such that the work of expansion of the gaseous product drives movable element 107 in a rotating motion.

Other embodiments are within the scope of the following claims.

What is claimed is:
1. A system comprising:
a first source including a first reactant;
a second source including a second reactant capable of reacting with the first reactant to form a first product; and
a reactor including:
a first element having a wall connecting a first point and a second point, the wall extending more than 180° around the first point; and
a second element movably engaged with the first element to define a reconfigurable reaction chamber capable of being in fluid communication with the first and second reactants.
2. The system of claim 1, wherein the wall crosses an imaginary line through the first and second points at least once on each side of the first point.
3. The system of claim 1, wherein the wall is asymmetric around the first point.

4. The system of claim 1, wherein the first element includes a first spiral element, and the second element includes a second spiral element movably engaged with the first spiral element.

5. The system of claim 1, wherein the reactor includes a plurality of chambers, each one of the plurality of chambers associated with a respective one of a plurality of regions of flow.

6. The system of claim 1, wherein the reactor further comprises a driver configured to move the second element relative to the first element and to change a configuration of the reconfigurable reaction chamber.

7. The system of claim 6, wherein the driver is configured to move the second element in an orbiting fashion around the first point.

8. The system of claim 6, wherein the driver is configured to shift a line contact between the first and second elements and to generate flow turbulence in the reaction chamber.

9. The system of claim 6, wherein the driver is configured to generate a near-wall shear force having a magnitude higher than a predetermined shear force threshold.

10. The system of claim 9, wherein the predetermined shear force threshold is a function of the configuration of the reaction chamber and a characteristic of a chemical reaction in the reaction chamber.

11. The system of claim 6, wherein the driver is configured to modify a geometry of the reaction chamber.

12. The system of claim 11, wherein the driver is configured to modify at least one of following: a size, a shape, and a relative position of complementary components of the reaction chamber.

13. The system of claim 1, wherein the reactor further includes a controller configured to detect and control a condition of a chemical reaction in the reaction chamber.

14. The system of claim 13, wherein the condition of the chemical reaction is selected from the group consisting of: a temperature, a pressure, a flow rate, a mixing rate of the first and second reactants, a rate of thermal energy transfer, and a rate of mass transfer.

15. The system of claim 13, wherein the reactor is in thermal contact with a heater or cooler, and the controller is capable of controlling a rate of thermal energy transfer between the heater or cooler and the reactor.

16. The system of claim 1, further comprising a chamber housing capable of being in fluid communication with the reaction chamber.

17. The system of claim 16, wherein the chamber housing is coupled to a pressure regulator configured to regulate a pressure gradient between an inert fluid in the chamber housing and a mixture of the first and second reactants in the reaction chamber.

18. The system of claim 16, wherein the chamber housing is configured to relieve pressure in the reaction chamber at a predetermined pressure threshold.

19. The system of claim 1, wherein each of the first and second reactants is in liquid form, the first and second reactants which may have a different fluid property.

20. The system of claim 19, wherein the first and second reactants have different viscosities.

21. The system of claim 1, wherein the reactor further includes a catalyst.

22. The system of claim 21, wherein the catalyst is associated with the wall of the first element in the reaction chamber.

23. The system of claim 1, further comprising a source capable of delivering photons into the reaction chamber.

24. A method of conducting a chemical reaction comprising:

changing a configuration of a reaction chamber containing the reaction, the reaction chamber being defined by a first element and a second element movably engaging the first element, wherein the first element has a wall connecting a first and second point, the wall extending at least 180° around the first point.

25. The method of claim 24, wherein the reaction includes a first reactant capable of forming a first product.

26. The method of claim 24, wherein the reaction includes a first reactant and a second reactant, the first and second reactants being liquids having a different fluid property.

27. The method of claim 26, wherein the first and second reactants have different viscosities.

28. The method of claim 24, wherein the wall the first element includes a first spiral element, and the second element includes a second spiral element movably engaged with the first spiral element.

29. The method of claim 24, wherein changing the configuration of the reaction chamber includes changing a temperature, a pressure, and/or a geometry of the reaction chamber.

30. The method of claim 29, wherein changing the geometry of the reaction chamber includes modifying one of following: a size, a shape, and a relative position of complementary components of the reaction chamber.

31. The method of claim 24, wherein changing the configuration of the reaction chamber includes moving the second element relative to the first element.

32. The method of claim 24, wherein changing the configuration of the reaction chamber includes orbiting the second element around the first point.

33. The method of claim 24, wherein changing the configuration of the reaction chamber includes shifting a line contact between the first and second elements and generating a flow turbulence in the reaction chamber.

34. The method of claim 24, wherein changing the configuration of the reaction chamber includes generating a near-wall shear force having a magnitude higher than a predetermined shear force threshold.

35. The method of claim 24, further comprising controlling a condition of the chemical reaction in the reaction chamber.

36. The method of claim 35, wherein the condition of the chemical reaction includes at least one of following: a temperature, a pressure, a flow rate, a mixing rate of the first and second reactants, a rate of thermal energy transfer, and a rate of mass transfer.

37. The method of claim 24, further comprising placing the reaction chamber in fluid communication with a chamber housing.

38. The method of claim 37, further comprising controlling a pressure gradient between an inert fluid in the chamber housing and the material in the reaction chamber.

39. The method of claim 37, further comprising relieving pressure in the reaction chamber at a predetermined pressure threshold through the chamber housing.

40. The method of claim 24, further comprising changing a reaction rate of the chemical reaction with a catalyst in the reaction chamber.

41. The method of claim 24, further comprising changing a reaction rate of the chemical reaction with photons in the reaction chamber.

42. A reactor for conducting a catalytic chemical reaction, the reactor comprising:
a first element having a wall connecting a first and second point, the wall extending more than 180° around the first point;

a second element movably engaged with the first element to define a reconfigurable reaction chamber capable of being in fluid communication with the first and second reactants; and a catalyst capable of changing a reaction rate of the chemical reaction.

43. The reactor of claim 42, wherein the wall crosses an imaginary line through the first and second point at least once on each side of the first point.

44. The reactor of claim 42, wherein the wall is asymmetric around the first point.

45. The reactor of claim 42, wherein the first element includes a first spiral element, and the second element includes a second spiral element movably engaged with the first spiral element.

46. The reactor of claim 42, wherein the reactor includes a plurality of chambers, each one of the plurality of chambers associated with a respective one of a plurality of regions of flow.

47. The reactor of claim 42, wherein the reactor further comprises a driver configured to move the second element relative to the first element and to change a configuration of the reconfigurable reaction chamber.

48. The reactor of claim 47, wherein the driver is further configured to shift a line contact between the first and second elements and generate a flow turbulence in the reaction chamber.

49. The reactor of claim 47, wherein the driver is further configured to generate a near-wall shear force having a magnitude higher than a predetermined shear force threshold.

50. The reactor of claim 42, further comprising a controller configured to control a condition of the chemical reaction in the reaction chamber.

51. The reactor of claim 50, wherein the condition of the chemical reaction includes at least one of following: a temperature, a pressure, a flow rate, a mixing rate of the first and second reactants, a rate of thermal energy transfer, and a rate of mass transfer.

52. The reactor of claim 42, wherein the catalyst includes a catalyst film on a wall of the reactor.

53. The reactor of claim 42, wherein the reactor is further configured to receive a first reactant associated with the chemical reaction.

54. A reactor for conducting a photochemical reaction involving a first material, the reactor comprising:

a first element having a wall connecting a first and a second point, the wall extending at least 180° around the first point;

a second element movably engaged with the first element to define a reconfigurable reaction chamber capable of being in fluid communication with the first and second reactants; and a light path configured to allow passage of photons into the reaction chamber and to change a reaction rate of the photochemical reaction.

55. The reactor of claim 54, wherein the wall crosses an imaginary line through the first and second point at least once on each side of the first point.

56. The reactor of claim 54, wherein the wall is asymmetric around the first point.

57. The reactor of claim 54, wherein the first element includes a first spiral element, and the second element includes a second spiral element movably engaged with the first spiral element.

58. The reactor of claim 54, wherein the reactor includes a plurality of chambers, each one of the plurality of chambers associated with a respective one of a plurality of regions of flow.

59. The reactor of claim 54, wherein the light path includes an optical fiber associate with the wall of the first element and configured to deliver the photons to illuminate the reaction chamber.

60. The reactor of claim 59, wherein an index of refraction of the optical fiber satisfies a predetermine criterion in relation to an index of the reaction medium.

61. The reactor of claim 54, wherein the light path includes a quartz window.

62. The reactor of claim 54, wherein the reactor is coupled to a controller for controlling the passage of photons into the reaction chamber.

63. The reactor of claim 62, wherein the controller is configured to control at least one of following: a timing, a duration, and an amplitude of one or multiple doses of illumination.

64. The reactor of claim 62, wherein the reactor is coupled to a light source capable of generating photons associated with a plurality of ranges of wavelengths.

65. The reactor of claim 64, wherein the controller is configured to selectively allow a group of photons into the reaction chamber, the group of photons corresponding to a desired range of wavelengths determined based on a nature of the chemical reaction.

66. The reactor of claim 54, wherein the wall of the first element is coated with a photocatalyst capable of changing the reaction rate of the chemical reaction.

67. The reactor of claim 54, wherein the reactor is further configured to receive a first reactant associated with the chemical reaction.

* * * * *